Patented Apr. 7, 1942

2,278,473

UNITED STATES PATENT OFFICE 2,278,473

COFFEE

Albert Musher, New York, N. Y., assignor to Musher Corporation, New York, N. Y., a corporation of New Jersey No Drawing. Application March 20, 1941, Serial No. 384,263

9 Claims. (Cl. 99—65)

The present invention relates to coffee and it particularly relates to the preparation of coffee beans, in their whole or ground form, so that they may be better and more economically roasted, or prepared, or brewed, or so as to have entirely new qualities not heretofore possible.

In the present methods of roasting coffee, a relatively high heat treatment for a considerable length of time is necessary in order to produce the desired roasting quality. This high heat treatment produces decomposition of various products within the coffee bean, and produces various off-flavors and various disagreeable qualities that it would be desired to eliminate if this were possible.

Also, by the present method of roasting coffee, complete uniformity is not obtained in view of the fact that the bean has some thickness and naturally, as the bean is roasted, the exterior portions of the bean are roasted first and the heat penetrates to the inner portions only gradually, thereafter. This produces lack of uniformity in the coffee bean by not permitting the entire portion of the bean to receive relatively the same treatment throughout.

Likewise, in the processes for cooling the bean after it is roasted, as for instance, in the water quenching and in the air cooling that follows, it obviously takes longer for the cooling water, or for the blast of air to get to the inner portions of the bean, and therefore, the cooling procedure starts from without and only gradually goes into the inner portion. In this way, the heat of the bean throughout its entire structure is not stopped immediately, as it is desired to do.

Still further, in the present methods of roasting, a considerable amount of time is involved in this procedure, and economical methods for reducing this time have heretofore not been found.

Also, it has been heretofore necessary to grind the roasted coffee beans before boiling them so as thereby to enable a more ready and more highly flavored coffee brew. Obvious economies and advantages could be obtained if this procedure could be eliminated.

It is therefore among the objects of the present invention to provide an improved coffee bean, and an improved resultant coffee brew, and methods for producing a coffee bean in which the time and heat of roasting may be reduced so as to provide a number of advantages as, for instance, lower cost, better quality of the coffee, and similar advantages.

A further object of this invention is to provide a method whereby the coffee beans may receive a substantially more uniform roasting treatment, and also whereby the heat of roasting will pass substantially quickly into the interior portions of the bean and thereby produce more quickly, relatively the same roasting conditions within the bean as on the outside of the bean.

It is a still further object of this invention to provide coffee beans in a condition whereby they may be more readily cooled by water quenching, for instance, or by air cooling, or by both methods, and so that the cooling of these beans after roasting may take place substantially quicker than heretofore possible.

Another object of this invention is to provide coffee beans which will produce a new type of ground coffee in physical characteristics, and also to provide a ground coffee that will produce relatively more flavor or more strength and that will have other new qualities as compared with present ground coffee.

A still further object of the present invention is to provide coffee beans which, when brewed without grinding, will produce substantially more coffee flavor and coffee strength as compared with the present normally roasted whole or unground coffee beans.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing these objects the coffee beans, which may be either green or roasted, are placed in a closed chamber in which they are subjected to an elevated pressure ranging, for example, from between about 20 or 25 pounds per square inch to about 350 to 450 pounds, or more, per square inch and at a temperature ranging for example from between about 250° F. to 700° F. and for a time period ranging, for instance, from about 5 or 10 seconds to about 8 or 10 minutes, or longer, depending upon the results desired, and the equipment and other conditions that are used.

Generally used pressures range, for example, from about 100 or 150 pounds to about 300 or 350 pounds per square inch, generally used temperatures range from about 300° F. to about 550°

F., and generally used time periods from about 20 or 30 seconds to about 3 or 4 minutes.

During this procedure the chamber may or may not be rotated, as desired.

The chamber is then suddenly and instantaneously opened into a low pressure (preferably relatively unconfined) area, such as the atmosphere, whereupon the coffee beans are ejected from the chamber and result in a cell disrupted or structure disrupted condition so as generally to provide openings, crevices, passageways, or similar openings, or so as to provide an expanded or relatively more porous bean which may allow air, moisture, steam or various solvents or other materials to more readily enter into or penetrate within the structure of the coffee bean.

The pressure and temperature may be obtained by introducing saturated or superheated steam into the chamber, or if desired, the chamber may be externally heated, in which case steam may be admitted to the chamber or, the moisture content of the coffee bean may be so regulated so that the moisture from within the coffee bean will generate the necessary pressure. For various modifications and results in carrying out this invention the steam may be moist or dry.

It is, at times, of advantage to process the coffee beans in accord with this invention using a procedure whereby the coffee beans are treated within the higher ranges of pressure for very short periods of time, using saturated steam so as to produce as little heat as possible. This procedure may be used where it is desired to expose the coffee bean to a greater disrupting explosion while holding the exposure to heat, as low as possible. Also, various flavoring materials such as fruit or vegetable juices, or vanilla or spices, etc., for example, or other flavoring materials, either dry or liquid, or water, may be admitted or placed in the chamber so as to become impregnated within the coffee beans during this treatment, or so as to otherwise modify the resultant product.

For the carrying out of this expansion or explosion procedure the coffee beans should generally have a moisture content below 20% or 25% and generally below 10% to 15%. If, either naturally, or because of prior treatment or otherwise, there is too much moisture in the bean to enable the required explosion, this additional moisture may be removed by various drying procedures as for example, by placing them in the sun, or in a tray dryer at a temperature ranging for instance from about 90° F. or 100° F. to about 160° F. or 180° F. or 200° F., until the water content is reduced, to the required moisture. Various other drying or dehydrating procedures that may be used are for example, dry heat, oil roasting, or dry roasting.

Also, if the coffee beans that are to be exploded are a little too dry for the required explosion, additional moisture may be added to them or to the expanding chamber, as for example in the form of water or other aqueous materials, or in the form of steam, or superheated steam. Likewise, if desired, the coffee beans may be steamed or cooked, either at atmospheric pressure or under vacuum or superatmospheric pressure, so as to get additional moisture into the beans, or so as to give them some softening if this is desired.

Following the explosion or expansion treatment herein described, the coffee beans, particularly green coffee beans, may then be placed into the regular coffee roasting oven in which they are then roasted in the desired manner. In view of the more opened structure of the coffee bean, the heat of the roasting operation is enabled to enter more quickly and more uniformly into the structure so as to produce a coffee bean of substantially better quality.

Also, in the roasting of the more opened-structure coffee bean, the degree of heat and/or the length of time required for the roasting treatment may be substantially reduced.

By being able to reduce the roasting temperature from about 500° F. to 400° F., for example, or by being able to reduce the length of time for such roasting procedures from 30 minutes to about 20 minutes, for instance, the coffee bean appears to be improved in appearance and in the quality of the ground coffee and the resultant brew that is obtained therefrom.

Further, although a shorter roast may be used in conjunction with the exploded bean, the degree of roast is generally the same as is accomplished by the longer roasting of the usual non-exploded coffee bean of commerce.

While coffee beans are still in the roaster, and immediately upon completion of the roast, water is generally immediately thrown on the coffee beans so as to check the roast so that the hot bean does not continue to roast and thereby over-roast itself because of its own heat. Heretofore, it required a relatively longer time period for the water to cool the interior of the bean as well as the exterior portion, but now, this cooling by the water quenching takes place considerably more rapidly in view of the expanded or opened characteristic of the coffee beans. The water is now enabled to more readily penetrate into the interior of the beans and thereby it is enabled to produce a more rapid and more uniform and more thorough cooling.

Also, after the beans have been roasted and water quenched, they are in many cases subjected to an air cooling so as to still further cool them in order to keep them from becoming burnt or over-roasted. Here again, because of the more open nature of the coffee beans, the air is better enabled to get into the inner structure of the coffee beans and so as thereby to provide a more rapid, more uniform, and more thorough cooling. Also, to retard oxidative development, carbon dioxide, or other inert gases may be used instead of air for the cooling process.

Still further, where quicker cooling results, the coffee beans will retain considerably more flavor in view of the fact that there is not the usual amount of evaporation of the volatile essential flavoring materials, or the degree of decomposition that normally takes place when this period of cooling is extended over longer periods of time. This obviously is of considerable importance in the production of coffee.

A further advantage of the procedure herein described in conjunction with coffee is that less shrinkage takes place in the coffee bean. In many cases this shrinkage of the coffee bean due to the roasting operation may average around 16%, but now in view of the fact that a lower heat or a shorter period of time is required, for instance, there is less shrinkage that takes place.

Also, many coffee roasters like to replace part of this shrinkage by placing an amount of water on the beans, and have this water absorbed therein. This replacement of moisture is enhanced by the use of the present invention in view of the fact that the bean is now of a relatively more absorbent nature so as thereby to enable absorption of more moisture back into its structure.

The coffee beans after they are cooled may then be ground in the usual way, as desired. However, various advantages may now be noted over ground coffee which has not been treated in accord with this invention.

With reference to the ground coffee of this invention there may be noticed an increased and better coffee flavor because of the disruption of the structure of the bean or because of the rupture of the cell structure so as to permit greater extraction of the coffee flavor therefrom when the coffee is boiled in the making of the brew. Also, the ground coffee of this invention apparently brews faster.

Still further, various new and improved types of grinds, and new types of ground or pulverized particles may be produced from the exploded coffee of this invention.

In the brewing of the coffee of this invention the water of the boiling medium seems to have the opportunity of entering more readily into the interstices and into the pores, openings, and cells, of the coffee bean pieces, as thereby to develop and extract the flavors and essences therefrom to a much higher degree than would result from prolonged boiling of the original unexpanded product. Still further the coffee of this invention, and particularly the ground coffee has improved water wetting quality.

Also, in many cases, the roasted coffee beans produced in accord with this invention do not have to be ground in order to make a coffee brew, in view of the fact that the expanded or exploded coffee of this invention, is in a substantially more water absorbent condition, particularly when exposed to boiling water. Also, in view of the disruption and expansion of the cells and structure thereof, the boiling water has much more surface contact with the beans than heretofore and it is thereby enabled to dissolve or carry out more of the extractive material from the coffee bean. Thereby, the exploded coffee bean of this invention when boiled with water may be utilized to produce more of the coffee flavor and other coffee characteristics as compared with the coffee bean that has not been treated in accord with this invention.

In many cases, therefore, this process permits the use of coffee beans in their roasted whole condition rather than in their roasted ground condition. Thereby, the roasted coffee beans may be transported and stored in their whole condition rather than in ground condition. In this way less oxidation or loss of flavor takes place.

In carrying out this invention, it is at times desirable to subject the coffee beans to another explosion treatment, as described, after they have been roasted. This may be done for the purpose of still further opening the structure of the coffee beans, or disrupting or rupturing the cells or structure thereof.

In fact, depending upon the characteristics desired in the finished product, the original explosion, prior to the roasting, may be at higher degrees of temperature and pressure, than the explosion that takes place after roasting. Or, if desired, the explosion prior to roasting may be milder than the explosion that takes place after the roasting procedure. The purpose of the explosion prior to the roasting may be to expand the structure of the coffee bean, and the purpose of the explosion after the roasting may be to disrupt the cell structure thereof to a greater extent.

It is also quite possible as one embodiment of this invention not to explode the coffee beans at all prior to the roasting, but to explode them after the beans have been roasted. In this case, of course, there will not be the advantages that accrue in the roasting operation, but, after the beans have been roasted, the coffee beans may be subjected to the explosion procedure as herein disclosed, and thereupon a structure disrupted or relatively open or expanded form may be produced so as to permit quicker brewing and the extraction of a greater amount of flavor, etc., than heretofore possible.

In carrying out this invention, it is also possible to precook in water or other liquids, or to steam, freeze, dry roast or oil roast, multiple explode, enzyme treat, water wash or water soak the coffee beans in order to obtain the specific results required. Also, various combinations of these embodiments may be utilized at different places in the procedure.

Wherever the coffee beans are to be exploded following any of these embodiments in which water or moisture is used, it generally will be necessary to dry the coffee beans as herein described, prior to the subsequent explosion treatment.

Where the coffee beans are frozen so as to enhance the breaking of their cell structure, the coffee beans should be given a slow freeze so as to build up relatively large ice crystals therein and so as thereby to aid in disrupting the cells. Also, for this freezing procedure, the coffee beans should have sufficient moisture within them so as to enable the formation of ice crystals of sufficiently large size. If necessary, steaming, water boiling, or other moisture absorption treatments may be used to incorporate a sufficient quantity of water within the coffee beans before the freezing procedure.

The advantage of using the multiple explosion treatment in the processing of the coffee beans is that lower temperatures and lower pressures may be utilized than would have to be used to produce relatively the same results if a single explosion were used. In the carrying out of multiple explosion, the explosion or chamber treatment above described is repeated one or more times. These repeated treatments may be carried on at the same temperatures and pressures, at higher temperatures and pressures, at lower temperatures and pressures, or at variable temperatures and pressures than the original explosion.

The explosion or expansion procedure as disclosed herein may be used in conjunction with green coffee beans, or in conjunction with coffee beans that have been partially roasted, or which have been roasted in various degrees as for instance, to the extent of a mild roast, a medium roast, or a high roast. The utilization of either green coffee beans, or partially roasted coffee beans, or coffee beans which have been roasted in various ways, or to various extents, will result in different types of products when exploded thereafter.

Also, various sequences may be used in the roasting and explosion operation. For instance, the beans may first be given a mild roast, and then a mild explosion, which may be followed by another roasting operation either with or without steaming, and dehydration if required, or another explosion may follow thereafter, either singly, or as multiple explosions. Likewise various other sequences and combinations of various treatments may be utilized to accomplish the specific results desired.

The size, porosity, and other characteristics of the coffee beans made under this invention may be controlled by varying such factors as, for instance, the temperature of the expansion treatment, the time of the explosion treatment, and the pressure to which the coffee beans are subjected during such explosion treatment.

Also, the conditions to which the foods are subsequently subjected upon ejection from the pressure chamber or gun will also control or modify the porosity and characteristics of the coffee beans. It is possible to control the expansion, porosity, etc., and to develop variations or new characteristics and qualities in the treated beans of this invention by ejecting them from the pressure chamber into atmospheres having higher or lower pressures than atmospheric, or into a partial or complete vacuum, or also into various atmospheres which may contain inert gases such as carbon dioxide, nitrogen, or even quantities of oil or aqueous vapors.

It is desirable at times to place a coating on, or to impregnate the material within the coffee beans so as to permit the formation of harder walls so as thereby to result in a greater or more efficient explosion of the product. Starch, resins, gums, sugars, and similar materials may be used to provide such a coating, as, for instance, by mixing these materials with water, or aqueous materials, then coating the coffee bean, and then allowing to dry thereon.

The coffee beans treated with the explosion procedure of this invention may be ejected from the pressure chamber, if desired, into oil or molten fat, or into molten sugar, or, as hereinabove disclosed, into fatty or other vapors, or into atmospheres of nitrogen, carbon dioxide or other inert gases, etc. These embodiments may be used to aid in retention of flavors, or in the retarding or elimination of discoloration, oxidation, etc.

Also, because of the relatively absorbent nature of the exploded coffee beans, various types of flavors, or essences, or flavoring materials, may be absorbed into the structure thereof and dried therein, if desired. Likewise these coffee beans may be coated or dusted or impregnated with various preservatives or protectives against deterioration, either in dry from, or mixed with liquid materials.

In some cases it may be desired to coat the coffee beans with a hygroscopic material, or with a material which may tend to harden or cake when it comes into contact with moisture of the atmosphere, or other moisture. In these cases, it is of advantage, as one embodiment of this invention, to mix the hygroscopic materials with a water repellent material as for instance, a hydrogenated hard fat of a melting point of 110° F. or 115° F. After the hygroscopic material and the water repellent material have been thoroughly mixed together, then the coffee beans may be coated with this fat-hygroscopic material mixture and this material allowed to harden thereon. The hygroscopic materials, which may be of the nature of powdered milk, are held within the congealed water repellent which acts to protect the powdered milk against the deterioration of moisture or other deterioration effects.

The explosion procedure of this invention is of considerable importance in view of the fact that it may be utilized to disrupt the cell structure not only so as to enable the boiling water of the brewing operation to contact the interior cells more readily and thereby so as to develop more flavor, but also to aid the bound water, or bound oils, or other bound cell-held materials that are contained therein to be more readily eliminated so as to enhance the flavor of the finally brewed coffee.

The invention as herein disclosed may be utilized also in conjunction with various other coffee processes. For example, this invention may be used to advantage in the preparation of coffee extracts, and coffee flavors, and in the preparation of quick-dissolving, or soluble coffee. Also, this invention is of considerable advantage in de-caffeinating coffee or in producing powdered, or modified coffee. In fact, this invention offers advantage in any procedure where solvents are used, or where extraction, or expression processes are used in conjunction with coffee beans whether they be, for instance, green or roasted, ground or pulverized, or otherwise processed.

In the de-caffeinating procedure, for instance, the exploded coffee bean may be subjected to a solvent extraction procedure with various solvents, as for example, water, alcohol, and so forth, so as to remove a partial or substantial amount of caffeine or other materials therefrom. This procedure may be regulated so as to have the coffee bean retain substantially its original shape or form following the de-caffeinating process. Likewise, the de-caffeinating procedure may be also used, for example, with the ground or pulverized exploded coffee bean.

Various flavors or other elements that have been removed from the coffee bean with the caffeine may be replaced, if desired, by various procedures, as for instance, by solubilizing them, and then drying, baking, or coating them on or within the treated coffee bean.

In the carrying out of this invention it may be noted with reference to the exploded coffee beans that they are not later affected from a rancidity standpoint to the same extent as would normally be the case. A similar advantage would likewise apply to the oil that may be extracted from the exploded coffee beans.

Likewise, there are various materials within the coffee beans which require not only high temperatures, but also longer periods of high temperatures in order to deteriorate to the fullest extent. Under the conditions of this invention, however, the length of time and the degree of temperature may be controlled so as not to fully decompose these materials, or, at least, so as not to deteriorate them to the usual extent.

If desired, the explosion of the coffee beans is adjusted so as to have them retain substantially their unity immediately following the explosion.

Another advantage of the present invention is that green coffee beans may now be more readily ground or broken or pulverized by first exploding them in accord with the disclosures herein. Heretofore it has been quite difficult to grind green coffee beans due in large measure to the hardness of the coffee bean. However, the explosion procedure of this invention produces a quality in the green coffee bean that permits the grinding of these green coffee beans considerably more readily than heretofore possible.

After the grinding of the coffee beans, a roasting, or heating, or other procedure may be used.

The coffee roasting process is quite complex in nature. Obviously, the length of time of the heating process and also the degree of the temperature is of considerable importance and determines to a large extent the nature of the resultant product that is produced. Various types of roast that may be produced, are for instance what is known as the light roast, the medium roast, the dark roast, or the Italian or French roast.

However, irrespective of the method or type of roasting that is used, or of the various embodiments that are utilized, the procedure as herein described is of importance in producing entirely new and unexpected results and in developing new flavor and quality characteristics.

Not only may the whole coffee bean be exploded as outlined herein, but also, ground coffee, whether green or roasted, and particularly when ground into larger pieces or pulverized particles, may be advantageously exploded in accord with the procedure outlined herein. Advantages of ground coffee which has been exploded in their ground condition include, for example, improved water wettable quality, improved brewing quality, expanded bulk and other advantages. Also, expanded ground coffee may be more readily placed in the usual percolator or perforated brewing receptacle with less tendency for the coffee to come through the perforations as is the case with finely ground non-exploded coffee.

*Example I*

Santos green coffee beans are placed in a closed chamber and saturated steam is allowed to enter into the chamber so as to build up as quickly as possible a pressure of 215 pounds per square inch at a temperature of about 395° F. The coffee beans are kept in the chamber under these conditions for a period of 1 minute, and immediately thereafter the chamber is suddenly opened to the atmosphere so as to result in an instantaneous drop in pressure and ejection of the coffee beans.

*Example II*

Santos green coffee beans are treated in accord with the process explained in Example I.

These exploded coffee beans are then placed in a revolving roasting oven and are roasted at a temperature of about 450° F. for a period of about 20 minutes. Immediately after the roasting, the coffee beans are given a water quench by spraying water on them while they are still in the roaster. Thereupon, the beans are removed from the roaster and are subjected to an air blast to still further cool them so as not to permit over-roasting.

*Example III*

Santos green coffee beans are given the same treatment described in Example I except that the time period is 1½ minutes (or 2 minutes may be the time period), so as to develop a little more roast. For a heavier roast 4 minutes or 6 minutes may be used.

*Example IV*

Roasted coffee beans are given the same treatment described in Example I except that the time period is 30 seconds.

The exploded roasted coffee beans are then ground.

*Example V*

Examples of other varieties of exploded roasted coffee beans may be produced by treating the roasted Santos coffee beans of commerce according to the procedure described in Example I except changing the time period to 45 seconds, 1½ minutes, and 2 minutes, respectively. Various modifications in the expansion, structure disruption, degree of roast, etc., will be noted from the different examples so produced.

*Example VI*

Green Santos coffee beans are subjected to the process described in Example I except that the multiple explosion procedure is used. The coffee beans are subjected to three consecutive explosions under this multiple explosion procedure. Each explosion results from exposure of the coffee beans to a pressure of 215 pounds per square inch of saturated steam, a temperature of about 395° F. and a time period of 1 minute.

*Example VII*

Roasted coffee beans are ground so as to result in a very coarsely ground material. These coarsely ground coffee particles are exploded by being treated for a period of 20 seconds at a saturated steam pressure of 215 pounds per square inch in accord with the procedure described.

The exploded coffee beans of this invention, aside from being more readily ground or pulverized may also be more readily powdered.

Either in their whole condition or in their ground, pulverized or powdered condition, or so as to retard discoloration or so as to produce other enhanced qualities as for example, enabling higher retention of flavor, keeping the fibers and cells softer, etc., the exploded coffee materials may be coated, impregnated, or otherwise treated with protective materials and particularly with water repellent materials such as oils and fats and preferably with fats that are in a plastic or hardened condition at room temperature. Various other materials or combinations thereof may be used for impregnation, coating, etc., as, for example, sugar and particularly sugars of quickly dissolvable nature or sugars of non-crystallizable quality. Examples of fats or oils that may be used as various embodiments of this invention are, for instance, palm kernel stearin, hydrogenated peanut oil, hydrogenated cottonseed oil, olive oil, sesame oil, oleostearin, and so forth. Also, where required, paraffin, wax, or resins of edible nature, etc., may be used alone or may be mixed with the fat, preferably in small proportions. Examples of various sugars that may be used are, for example, honey, glucose, etc. Cane sugar may also be used. It may be melted and in this form impregnated within the coffee bean.

In the use of a molten plastic or hard fat for impregnating the coffee beans, this fat may be congealed in any normal way. However, it is generally preferred to use a quick chilling procedure so as to quickly chill the molten fat within the structure of the coffee bean and thereby so as to enable a more complete seal of the pores and structure of the bean.

The coffee materials of this invention may also be formed into cakes, briquettes or other individual units, with the same materials as above described for coating or impregnating purposes as, for example, with fats or sugars or combinations thereof.

A satisfactory procedure for utilizing combinations of fats and sugars for briquetting purposes is, for example, to coat or impregnate the pieces or particles of the exploded materials with hydrogenated peanut oil of approximately 115° F. melting point, this coating taking place by melting the hydrogenated peanut oil to a temperature of 140° F. and then mixing the exploded materials therewith at that temperature so as to have substantially all of the particles in coated condition. Then, after the hydrogenated peanut oil is allowed to congeal on the pieces of the exploded material, these fat coated pieces are mixed with a glucose of about 39° Baumé and then the mass is formed into a briquette. For increased durability, the briquette may be placed into a warm chamber at a temperature above the melting point of the fat, so as to melt at least some of the fat within the briquette. Thereupon, the briquette may be cooled so as to form a more durable brick.

This application is a continuation in part of application Serial No. 280,972.

What I claim is:

1. A steam exploded, expanded, structure disrupted coffee bean, said bean having enhanced brewing quality.

2. A sugar impregnated, steam exploded, expanded, structure disrupted coffee bean, the pores of which have the sugar substantially impregnated therein.

3. A ground, steam exploded, expanded, structure disrupted coffee bean particle.

4. The method of producing an enhanced coffee bean, said method comprising subjecting the coffee bean to steam at an elevated temperature and pressure and thereafter suddenly releasing the coffee bean to a lower temperature and pressure.

5. The method of producing an enhanced coffee bean, said method comprising roasting the bean and then subjecting the roasted bean to steam at an elevated temperature and pressure and thereafter suddenly releasing the coffee bean to a lower temperature and pressure.

6. The method of producing an enhanced green coffee bean, said method comprising subjecting the green coffee bean to steam at an elevated temperature and pressure and thereafter suddenly releasing the coffee bean to a lower temperature and pressure.

7. The method of producing an enhanced coffee bean, said method comprising subjecting the coffee bean to steam at an elevated temperature and pressure and thereafter suddenly releasing the coffee bean to a lower temperature and pressure, and then roasting the bean.

8. The coffee bean of claim 1, said coffee bean being a green coffee bean.

9. The coffee bean of claim 1, said coffee bean being a roasted coffee bean.

ALBERT MUSHER.